(12) United States Patent
Choi et al.

(10) Patent No.: US 10,909,769 B1
(45) Date of Patent: Feb. 2, 2021

(54) MIXED REALITY BASED 3D SKETCHING DEVICE AND METHOD

(71) Applicant: INDUSTRY ACADEMY COOPERATION FOUNDATION OF SEJONG UNIVERSITY, Seoul (KR)

(72) Inventors: Soo Mi Choi, Seoul (KR); Jun Han Kim, Anyang-si (KR); Je Wan Han, Seoul (KR)

(73) Assignee: INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 0 days.

(21) Appl. No.: 16/811,330

(22) Filed: Mar. 6, 2020

(30) Foreign Application Priority Data

Sep. 18, 2019 (KR) .................. 10-2019-0114815

(51) Int. Cl.
*G06T 19/00* (2011.01)
*G06F 3/01* (2006.01)
*G06T 17/10* (2006.01)
*G06T 3/00* (2006.01)

(52) U.S. Cl.
CPC ............ *G06T 19/006* (2013.01); *G06F 3/011* (2013.01); *G06T 3/0031* (2013.01); *G06T 17/10* (2013.01)

(58) Field of Classification Search
CPC ..... G06T 19/006; G06T 3/0031; G06T 17/10; G06F 3/011; G06F 3/03542; G06F 3/033; G06F 3/03545; G06F 3/03546; G06F 3/037; G06F 3/0383; G06F 3/0386; G06F 3/0354; G06F 3/03541; G06F 3/04883; G06K 9/00402
See application file for complete search history.

(56) References Cited

U.S. PATENT DOCUMENTS

| | | | | | |
|---|---|---|---|---|---|
| 5,546,476 | A | * | 8/1996 | Mitaka | G06K 9/48 382/201 |
| 5,577,135 | A | * | 11/1996 | Grajski | G06K 9/00422 382/187 |
| 5,583,542 | A | * | 12/1996 | Capps | G06F 40/166 345/173 |
| 5,602,570 | A | * | 2/1997 | Capps | G06F 40/166 345/173 |

(Continued)

FOREIGN PATENT DOCUMENTS

| JP | 08101889 A | 8/2001 |
|---|---|---|
| JP | 2015158752 A | 9/2015 |

(Continued)

*Primary Examiner* — Charles L Beard (57) ABSTRACT

The mixed reality based 3D sketching device includes a processor; and a memory connected to the processor. The memory stores program commands that are executable by the processor to periodically tracks a marker pen photographed through a camera, to determine whether to remove a third point using a distance between a first point corresponding to a reference point, among points that are sequentially tracked, and a second point at a current time, a preset constant, and an angle between the first point, the second point, and the previously identified third point, to search an object model corresponding to a 3D sketch that has been corrected, after correction is completed depending on the removal of the third point, and to display the searched object model on a screen.

5 Claims, 9 Drawing Sheets

(56) References Cited

U.S. PATENT DOCUMENTS

| | | | | |
|---|---|---|---|---|
| 5,608,855 A * | 3/1997 | Harashima | G06T 15/10 | 345/419 |
| 5,740,273 A * | 4/1998 | Parthasarathy | G06K 9/00416 | 382/187 |
| 5,889,889 A * | 3/1999 | Sinden | G06K 9/222 | 382/186 |
| 6,055,332 A * | 4/2000 | Aitani | G06K 9/00429 | 382/181 |
| 6,226,000 B1 * | 5/2001 | Richens | G06T 15/04 | 345/419 |
| 6,268,865 B1 * | 7/2001 | Daniels | G06T 11/001 | 345/582 |
| 6,348,924 B1 * | 2/2002 | Brinsmead | G06T 11/001 | 345/441 |
| 7,158,675 B2 * | 1/2007 | Gounares | G06F 3/04883 | 382/187 |
| 8,427,434 B1 * | 4/2013 | Merolla | G09B 11/10 | 345/173 |
| 8,467,596 B2 * | 6/2013 | Abadpour | G06T 7/12 | 382/151 |
| 8,478,006 B2 * | 7/2013 | Arakita | G06T 3/0037 | 382/128 |
| 8,988,461 B1 * | 3/2015 | Schmid | G06T 19/20 | 345/629 |
| 9,070,224 B1 * | 6/2015 | Esfahbod MirHosseinZadeh Sarabi | G06T 11/20 | |
| 9,142,056 B1 * | 9/2015 | Baran | G09G 5/026 | |
| 9,736,137 B2 * | 8/2017 | Thompson | G06F 3/041 | |
| 10,067,669 B1 * | 9/2018 | Mahmoud | G06K 9/344 | |
| 10,156,982 B1 * | 12/2018 | Mahmoud | G06K 9/344 | |
| 10,156,983 B1 * | 12/2018 | Mahmoud | G06K 9/222 | |
| 10,681,353 B2 * | 6/2020 | Moon | H04N 19/11 | |
| 10,725,650 B2 * | 7/2020 | Fujita | G06K 9/00429 | |
| 10,783,322 B2 * | 9/2020 | Smithrud | G06F 40/171 | |
| 10,805,607 B2 * | 10/2020 | Moon | H04N 19/176 | |
| 2002/0049795 A1 * | 4/2002 | Freeman | G06F 3/04883 | 715/256 |
| 2003/0185444 A1 * | 10/2003 | Honda | G06F 3/04883 | 382/186 |
| 2006/0210172 A1 * | 9/2006 | Sutanto | G06K 9/00416 | 382/229 |
| 2006/0250393 A1 * | 11/2006 | Tsang | G06F 3/04845 | 345/420 |
| 2007/0036437 A1 * | 2/2007 | Razdan | G06T 17/20 | 382/186 |
| 2007/0109281 A1 * | 5/2007 | Simmons | G06F 3/0481 | 345/179 |
| 2007/0242305 A1 * | 10/2007 | Onishi | G06F 3/0321 | 358/1.16 |
| 2008/0166048 A1 * | 7/2008 | Raif | G06F 3/043 | 382/187 |
| 2008/0198165 A1 * | 8/2008 | Sawazaki | G06T 15/005 | 345/467 |
| 2008/0304748 A1 * | 12/2008 | Koubaroulis | G06K 9/00409 | 382/186 |
| 2009/0040224 A1 * | 2/2009 | Igarashi | G06T 19/00 | 345/427 |
| 2009/0136136 A1 * | 5/2009 | Mori | G06K 9/222 | 382/187 |
| 2010/0098339 A1 * | 4/2010 | Kido | G06T 7/12 | 382/199 |
| 2010/0103178 A1 * | 4/2010 | Song | G06F 3/03545 | 345/473 |
| 2011/0069040 A1 * | 3/2011 | Ito | G06F 3/0484 | 345/178 |
| 2011/0113366 A1 * | 5/2011 | Cheong | G06F 3/04883 | 715/806 |
| 2011/0122139 A1 * | 5/2011 | Lee | G06T 11/203 | 345/441 |
| 2011/0248995 A1 * | 10/2011 | Vaughan | G06T 19/006 | 345/420 |
| 2011/0280484 A1 * | 11/2011 | Ma | G06K 9/00416 | 382/185 |
| 2012/0200517 A1 * | 8/2012 | Nikolovski | G06F 3/0433 | 345/173 |
| 2012/0282577 A1 * | 11/2012 | Chen | G09B 19/00 | 434/155 |
| 2012/0293456 A1 * | 11/2012 | Ikeda | G06F 3/04886 | 345/174 |
| 2013/0057540 A1 * | 3/2013 | Winnemoeller | G06T 19/20 | 345/419 |
| 2013/0127758 A1 * | 5/2013 | Kim | G06F 3/041 | 345/173 |
| 2013/0127836 A1 * | 5/2013 | Joshi | G06T 17/20 | 345/419 |
| 2013/0222381 A1 * | 8/2013 | Di Censo | G06F 3/0304 | 345/424 |
| 2013/0229390 A1 * | 9/2013 | DiVerdi | G06F 3/0488 | 345/179 |
| 2013/0229391 A1 * | 9/2013 | DiVerdi | G06F 3/0488 | 345/179 |
| 2013/0293554 A1 * | 11/2013 | Vostrikov | G06T 11/203 | 345/442 |
| 2013/0321328 A1 * | 12/2013 | Ahn | G06F 3/03549 | 345/174 |
| 2014/0058725 A1 * | 2/2014 | Longe | G06F 3/02 | 704/9 |
| 2014/0160125 A1 * | 6/2014 | Yoo | G06T 15/005 | 345/423 |
| 2014/0168142 A1 * | 6/2014 | Sasselli | G06F 3/044 | 345/174 |
| 2014/0180465 A1 * | 6/2014 | Nakano | G05B 19/4097 | 700/160 |
| 2014/0267106 A1 * | 9/2014 | Thompson | G06F 3/0481 | 345/173 |
| 2014/0327667 A1 * | 11/2014 | Kim | G06T 15/08 | 345/419 |
| 2014/0355885 A1 * | 12/2014 | Shibata | G06K 9/00402 | 382/189 |
| 2015/0062096 A1 * | 3/2015 | Sim | G06F 1/3265 | 345/179 |
| 2015/0301661 A1 * | 10/2015 | Leigh | G06F 3/0433 | 345/174 |
| 2015/0371417 A1 * | 12/2015 | Angelov | G06F 3/0412 | 345/442 |
| 2016/0054839 A1 * | 2/2016 | Kintzlinger | G06T 7/194 | 345/173 |
| 2016/0055681 A1 * | 2/2016 | Koyrakh | G06T 19/00 | 345/427 |
| 2016/0071327 A1 * | 3/2016 | Wu | G06T 5/002 | 382/154 |
| 2016/0139694 A1 * | 5/2016 | Go | G06F 3/03545 | 345/179 |
| 2016/0139732 A1 * | 5/2016 | Takeda | G06F 3/044 | 345/174 |
| 2016/0179364 A1 * | 6/2016 | Nicholson | G06F 3/04883 | 715/863 |
| 2016/0179365 A1 * | 6/2016 | Angelov | G06F 40/171 | 345/179 |
| 2016/0299606 A1 * | 10/2016 | Go | G06F 3/0383 | |
| 2017/0024061 A1 * | 1/2017 | Forlines | G06F 3/04166 | |
| 2017/0205224 A1 * | 7/2017 | Taniguchi | G01B 21/04 | |
| 2017/0236020 A1 * | 8/2017 | Petkov | G06F 3/03545 | 345/179 |
| 2017/0236021 A1 * | 8/2017 | Petkov | G06K 9/222 | 345/179 |
| 2018/0060689 A1 * | 3/2018 | Sklaroff | G06K 9/222 | |
| 2018/0061093 A1 * | 3/2018 | Liu | G06T 3/0081 | |
| 2018/0104106 A1 * | 4/2018 | Lee | G06T 1/0007 | |
| 2018/0121075 A1 * | 5/2018 | Resendez Rodriguez | G06F 3/04845 | |
| 2018/0173333 A1 * | 6/2018 | Maruoka | H04N 13/00 | |
| 2018/0239434 A1 * | 8/2018 | Lu | G06F 3/0346 | |
| 2019/0096123 A1 * | 3/2019 | Schaffer | G06F 3/03545 | |
| 2019/0164338 A1 * | 5/2019 | Choi | G06T 19/20 | |
| 2019/0265809 A1 * | 8/2019 | Shirai | G06F 3/046 | |
| 2019/0286894 A1 * | 9/2019 | Maruoka | G06F 3/03545 | |

(56) References Cited

U.S. PATENT DOCUMENTS

| | | | |
|---|---|---|---|
| 2019/0347865 A1* | 11/2019 | Hackett | G06F 30/00 |
| 2020/0241648 A1* | 7/2020 | Lu | G06F 3/0488 |
| 2020/0249773 A1* | 8/2020 | Lee | G06F 3/0488 |
| 2020/0264711 A1* | 8/2020 | Zimmerman | G06F 3/0416 |
| 2020/0367970 A1* | 11/2020 | Qiu | A61B 34/10 |
| 2020/0372723 A1* | 11/2020 | Komissarov | G06T 19/006 |

FOREIGN PATENT DOCUMENTS

| | | |
|---|---|---|
| KR | 101678510 B1 | 11/2016 |
| KR | 1020180000009 A | 1/2018 |

* cited by examiner

MIXED REALITY BASED 3D SKETCHING DEVICE AND METHOD

CROSS-REFERENCE TO RELATED APPLICATION

This present application claims priority under 35 U.S.C. § 119(a) to Korean Patent Application No. 10-2019-0114815 filed on Sep. 18, 2019, the entire contents of which are incorporated herein by reference.

BACKGROUND

(a) Technical Field

Embodiments of the present disclosure relate to a mixed reality based 3D sketching device and method.

(b) Background Art

Recently, various attempts using virtual reality (VR) technology are being made.

Alibaba provides an opportunity to experience a virtual shopping mall, thus showing a possibility that a virtual space will replace a real space. Google has released a tool called Tilt Brush that may perform a 3D sketch and modeling on the VR, thus greatly expanding the range of creative means. Furthermore, attempts are made to increase portability and accessibility by grafting the idea of the VR technology with smartphone-based augmented reality (AR) technology.

An app such as Just a Line is an example of reconfiguring the 3D sketch in the form of AR. However, existing 3D sketching systems have limitations. A VR-based sketching system is limited in accessibility and portability, and is impossible in multitasking.

Just a Line solving the above problems is configured to sketch its own trajectory by an Inertial Measurement Unit (IMU) installed in the smartphone. This is problematic in that a pen and a viewer work integrally without being separated from each other, so that it is not useful for anything other than games.

Furthermore, a Ramer-Douglas-Peucker algorithm is mainly used so as to minimize the number of points in the 3D sketch on the conventional augmented reality, but is not suitable to minimize the number of points in real time.

SUMMARY OF THE DISCLOSURE

The present disclosure has been made to solve the above-mentioned problems and difficulties and relates to a mixed reality based 3D sketching device and method that can increase work efficiency and can effectively reduce the number of data.

According to one aspect of the disclosure, the present disclosure provides a mixed reality based 3D sketching device, including a processor; and a memory connected to the processor, wherein the memory stores program commands that are executable by the processor to periodically tracks a marker pen photographed through a camera, to determine whether to remove a third point using a distance between a first point corresponding to a reference point, among points that are sequentially tracked, and a second point at a current time, a preset constant, and an angle between the first point, the second point, and the previously identified third point, to search an object model corresponding to a 3D sketch that has been corrected, after correction is completed depending on the removal of the third point, and to display the searched object model on a screen.

The marker pen may be a cube-type marker pen configured so that a marker may be attached to an entire outer surface of a cylinder structure.

The removal of the third point may be determined by the following Equation.

$$\text{if } \Theta_{(x,p)} < \alpha / \text{dist}(o,p) \text{ then Remove}(x) \quad \text{[Equation]}$$

where o is a reference point, p is a second point, and x is a third point.

The program commands may orthogonally project the 3D sketch that has been corrected into a 2D image, thus extracting a characteristic value, and may compare the extracted characteristic value with a previously stored 3D object model, thus searching a 3D object model corresponding to the 3D sketch.

According to another aspect of the disclosure, the present disclosure provides a mixed reality based 3D sketching method of performing a mixed reality based 3D sketch in a device including a processor and a memory, the method including periodically tracking a marker pen photographed through a camera; determining whether to remove a third point using a distance between a first point corresponding to a reference point, among points that are sequentially tracked, and a second point at a current time, a preset constant, and an angle between the first point, the second point, and the previously identified third point, searching an object model corresponding to a 3D sketch that has been corrected, after correction is completed depending on the removal of the third point, and displaying the searched object model on a screen.

According to a further aspect of the disclosure, the present disclosure provides a program for performing the above-described method.

According to the present disclosure, it is possible to track a marker even if a portion of a pen is visible through a cube-type marker pen and to minimize the number of points in real time by correction through an included angle.

DETAILED DESCRIPTION

Since the present disclosure may be embodied in many different forms, specific embodiments are illustrated in the drawings and described in detail.

However, the disclosure should not be construed as limited to the embodiments set forth herein. Rather, it is to be understood that all changes, equivalents, and substitutes included in the spirit and scope of the disclosure fall within the purview of the disclosure.

Figure 1:
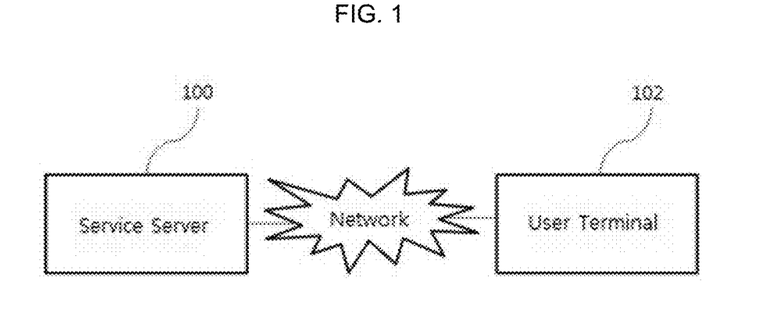
FIG. 1 is a diagram illustrating a mixed reality based 3D sketching system in accordance with an embodiment of the present disclosure.

FIG. 1 is a diagram illustrating a mixed reality based 3D sketching system in accordance with an embodiment of the present disclosure.

As illustrated in FIG. 1, the 3D sketching system in accordance with this embodiment may include a service server 100 and a user terminal 102.

The service server 100 and the user terminal 102 may be connected via a network. Here, the network may include, for example, an internet network, a mobile communication network, etc.

Figure 2:
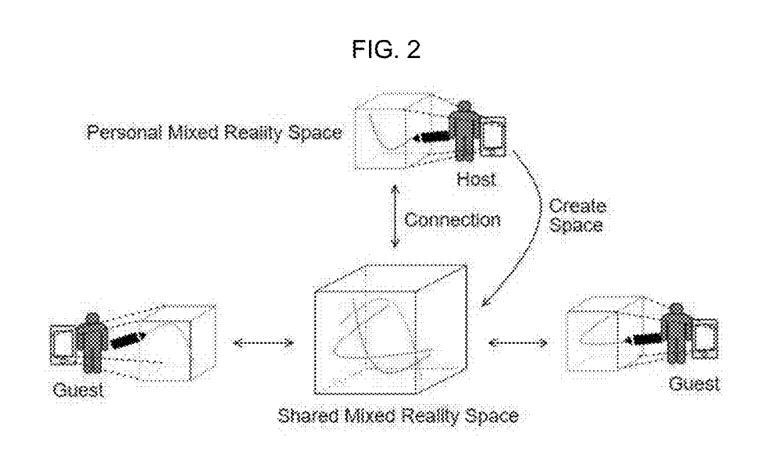
FIG. 2 is a diagram illustrating a mixed reality based service in accordance with the present embodiment.

FIG. 2 is a diagram illustrating a mixed reality based service in accordance with the present embodiment.

As illustrated in FIGS. 1 and 2, the user terminal 102 in accordance with this embodiment may include a host terminal that creates a shared mixed reality space, and one or more guest terminals that creates and edits an object applied to the shared mixed reality space created by the host terminal through a 3D sketch.

Of course, the host terminal may also create and edit the object.

The user terminal 102 in accordance with this embodiment may include a mobile communication terminal (smartphone), a tablet, a desktop, and a laptop in which an application (app) for creating and editing the object is installed. Hereinafter, an example where the user terminal is the smartphone will be described.

The app installed in the user terminal 102 is operated in conjunction with a pen including a marker to allow a trajectory sketched on a screen by a user to be displayed and edited.

Furthermore, the app in accordance with this embodiment creates a mixed reality space through a mobile augmented reality platform and simultaneously combines the mixed reality space and a real space through a camera, thus implementing an augmented reality.

The app in accordance with this embodiment may output an interface for the 3D sketch. The interface may include the shape, size, and color of the pen, sketch-related functions such as undo, redo, and erase, and functions that may be used after the sketch is completed, such as edit, save, load, model search, share, and cloud anchor (cloud anchor connection).

A marker pen in accordance with this embodiment is a cube-type pen to allow the marker to be easily recognized.

The service server 100 is connected to a plurality of user terminals 102 to provide a mixed reality service.

The service server 100 previously stores a plurality of 3D models applied to the mixed reality space. In the case of creating the 3D sketch in the user terminal 102, a corresponding object is searched and then is displayed on the mixed reality space.

Furthermore, the service server 100 may store coordinate information about the mixed reality space in which the host terminal is created, and share-related information (e.g., room code). Other guest terminals may create and edit the object displayed on the mixed reality space through the share-related information.

Figure 3:
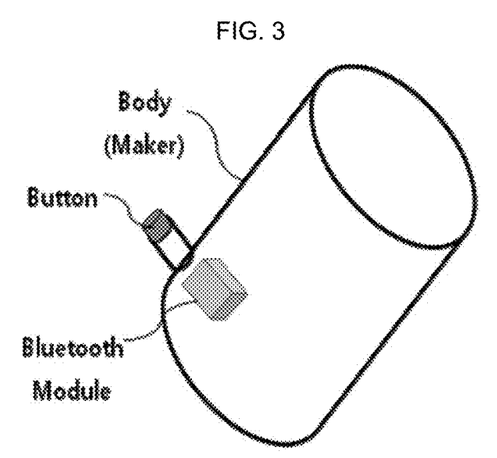
FIG. 3 is a diagram illustrating a configuration of a cube-type marker pen in accordance with an embodiment of the present disclosure.

FIG. 3 is a diagram illustrating the configuration of the cube-type marker pen in accordance with an embodiment of the present disclosure.

As illustrated in FIG. 3, the cube-type marker pen in accordance with this embodiment may be configured such that the marker is attached to an entire cylinder structure, and may include a button and a bluetooth module.

The button and the bluetooth module are used to start/stop a sketch work.

Conventionally, a hexahedral marker is provided on an end of the pen. However, if the marker is provided on the entire pen as disclosed in this embodiment, it is possible to track the marker even when a portion of the pen is visible.

The marker in accordance with this embodiment may be recognized through the camera provided in the smartphone. However, without being limited thereto, the camera installed in an outside instead of the smartphone may be placed in a proper location to recognize the marker. The smartphone may serve as only a viewer.

According to an embodiment of the present disclosure, in the case of performing the 3D sketch through marker tracking, a new technique is proposed to minimize the number of points.

Figure 4:
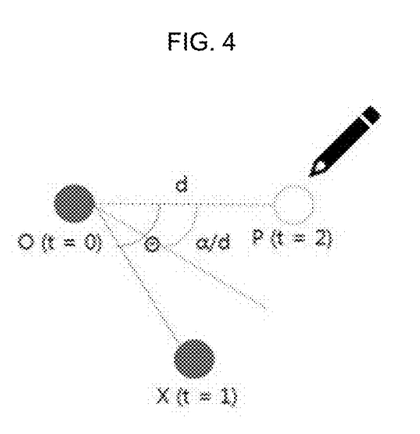
FIG. 4 is a diagram illustrating a process of determining whether to add a new point x through an included angle in accordance with the present embodiment.

FIG. 4 is a diagram illustrating a process of determining whether to add a new point x through an included angle in accordance with the present embodiment.

Referring to FIG. 4, in a process of adding the new point x(t=1) where a previous frame is tracked, an included angle θ between x and a current pen position p(t=2) with reference to a previously written point o(t=0) is calculated, and it is determined whether the included angle θ is smaller than a value obtained by dividing a preset constant α by a distance d between o and p.

This may be expressed by the following equation.

$$\text{if } \Theta_{(x,p)} < \alpha/\text{dist}(o,p) \text{ then Remove}(x) \qquad \text{[Equation 1]}$$

Here, a removal allowable range can be adjusted by adjusting the preset constant α.

Figure 5:
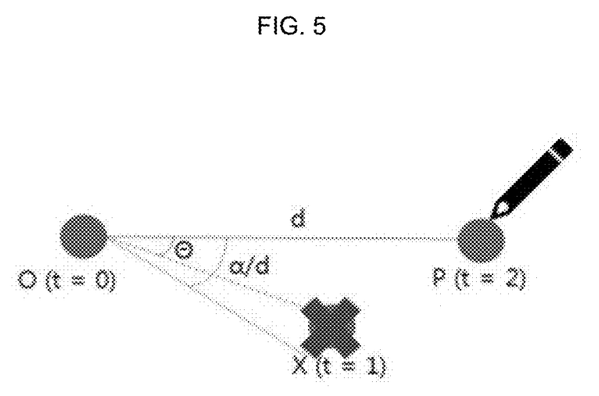
FIG. 5 is a diagram illustrating a case where the new point x is removed.

FIG. 5 is a diagram illustrating a case where the new point x is removed.

Referring to FIG. 5, if the included angle θ is smaller than a value obtained by dividing the preset constant α by the distance d between o and p, this is considered as noise and x is removed.

That is, since the point x of the previous frame has an angle difference smaller than a point p where the pen is currently located, the user terminal 102 considers x as noise and performs correction to remove x.

Figure 6:
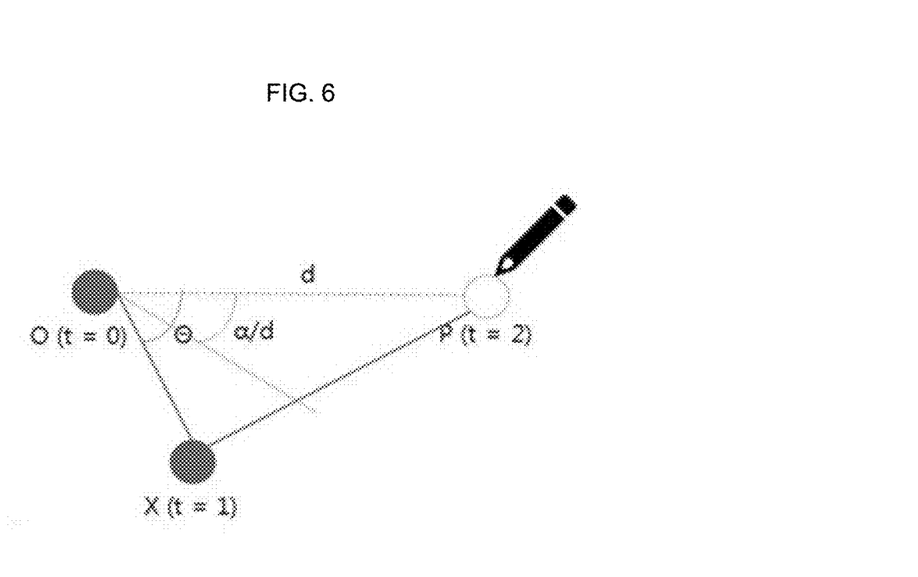
FIG. 6 is a diagram illustrating a case where the new point x is not removed.

In contrast, referring to FIG. 6, if the point x of the previous frame has an angle difference larger than the point p where the pen is currently located, x is not considered as noise, so that x is not removed.

Figure 7A:
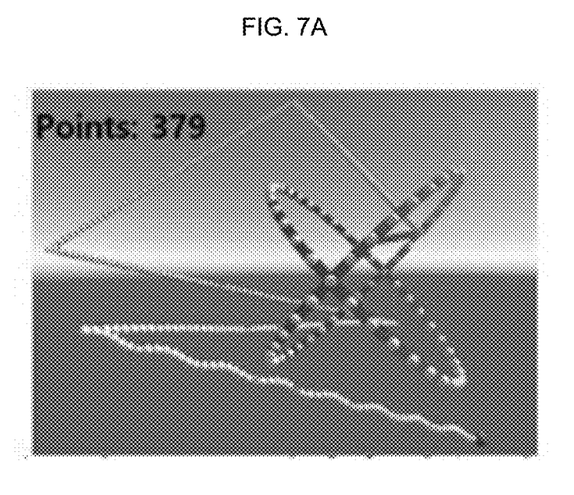
FIGS. 7A and 7B are a diagram illustrating a correcting process in accordance with the present embodiment.
Figure 7B:
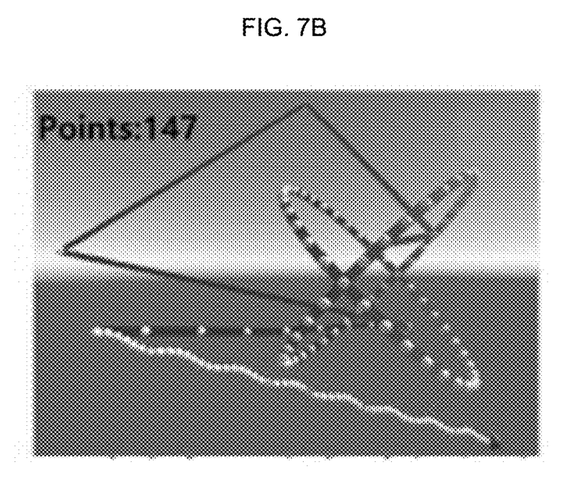

In the case of performing the correction using the included angle according to this embodiment, as illustrated in FIGS. 7A and 7B, both the correction and the minimization of the point may be performed even in a line that is finely bent due to a user's hand trembling.

Figure 8A:
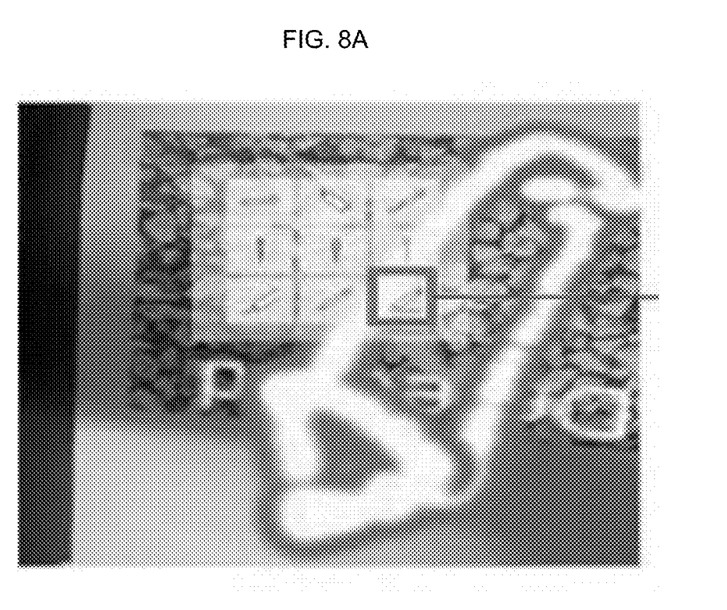
FIGS. 8A and 8B are a diagram illustrating a process of searching and inserting an object model corresponding to a 3D sketch in accordance with the present embodiment.
Figure 8B:
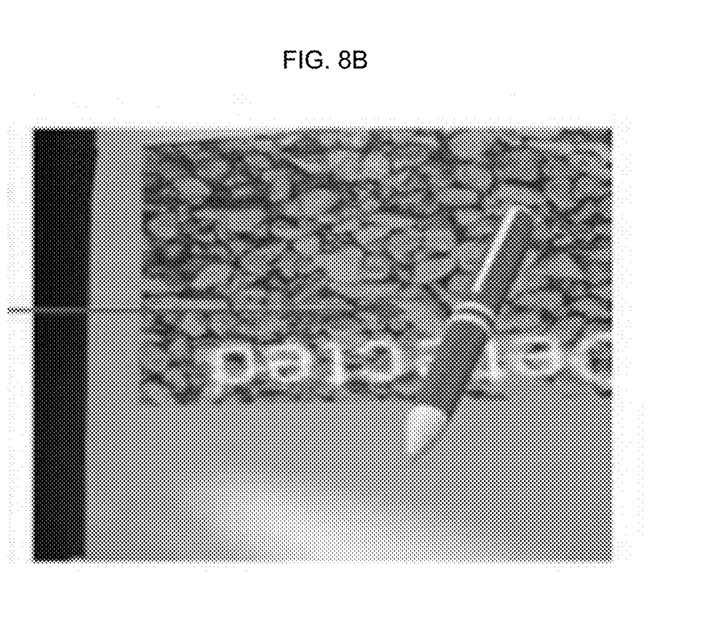

FIGS. 8A and 8B are a diagram illustrating a process of searching and inserting an object model corresponding to a 3D sketch in accordance with the present embodiment.

After the 3D sketch is completed using the cube-type marker pen, the user terminal 102 according to this embodiment orthogonally projects the 3D sketch into the 2D image depending on where the camera is looking, thus extracting a characteristic value. By using it as an index, a 3D object model stored in a database is searched.

Here, the 3D object model may be searched in conjunction with the service server 100.

A user may attempt a search until a desired model is found while continuously changing a direction in which he or she is looking. For each search, a system returns n models of a high rank in the order of matching of images used in the search and characteristic values. If the search is executed, the most similar models are shown on the screen as illustrated in FIG. 8A. If one of the models is selected, the model is inserted into the mixed reality space as illustrated in FIG. 8B.

According to this embodiment, the object completed through the app may be filed to be stored in or loaded from the service server 100 and be shared with others.

Since the database of the service server 100 is managed on an account basis, a user may perform the work more conveniently through a user's own account.

In order to share the mixed reality space, Cloud Anchors of Google may be used, for example.

The mixed reality space is created based on an anchor. The system according to this embodiment may be composed of a host that provides information about the anchor and guests that receive the information.

If the user of the host terminal taps on a specific anchor on the app, the information of the anchor tapped on the database and his or her own Room Code are stored. As illustrated in FIG. 8*b*, the guests may access the anchor shared through the Room Code.

Figure 9:
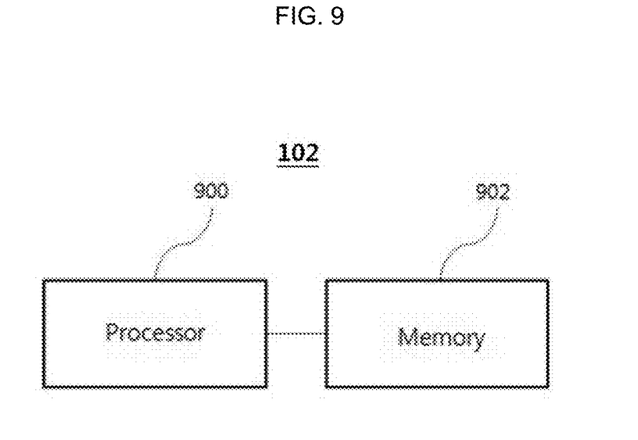
FIG. 9 is a diagram illustrating a configuration of a user terminal in accordance with an embodiment of the present disclosure.

FIG. 9 is a diagram illustrating the configuration of the user terminal in accordance with an embodiment of the present disclosure.

As illustrated in FIG. 9, the user terminal in accordance with this embodiment may include a processor 900 and a memory 902.

The processor 900 may, for example, include a central processing unit (CPU) that may execute a computer program, other virtual machines, etc.

The memory 902 may, for example, include a non-volatile storage device such as a fixed hard drive or a removable storage device. The removable storage device may, for example, include a compact flash unit, a USB memory stick, etc. The memory 902 may include a volatile memory such as various kinds of random access memories.

According to an embodiment of the present disclosure, the processor 900 periodically tracks the cube-type marker pen photographed through the camera using program commands stored in the memory 902, and identifies each tracked point.

The program commands according to this embodiment use an included angle $\Theta_{(x,p)}$ of three points (o, x, p in t=0 to t=2) that are sequentially tracked, a preset constant $\alpha$, and a distance d dist(o, p) between two points to determine whether to remove a preceding point (x in t=1).

The removal of x is continuously performed according to the tracking. When the 3D sketch is completed by the correction, this is orthogonally projected into the 2D image and then a characteristic value is extracted.

The extracted characteristic value is compared with the 3D object model that is previously stored, and the 3D object model corresponding to the 3D sketch is searched and then output on the screen.

Furthermore, the program commands according to this embodiment create the mixed reality space, and the created mixed reality space is stored in the database connected to the service server 100.

Guest terminals may access the mixed reality space created by another user through the anchor, and a new object may be created and edited through the 3D sketch in the accessed mixed reality space.

Although the present disclosure was described with reference to specific embodiments shown in the drawings, it is apparent to those skilled in the art that the present disclosure may be changed and modified in various ways without departing from the scope of the present invention.

What is claimed is:

1. A mixed reality based 3D sketching device, comprising:
    a processor; and
    a memory connected to the processor,
    wherein the memory stores program commands that are executable by the processor to periodically track a marker pen photographed through a camera, to determine whether to remove a third point using a distance between a first point corresponding to a reference point, among points that are sequentially tracked, and a second point at a current time, a preset constant, and an angle between the first point, the second point, and the previously identified third point, to search an object model corresponding to a 3D sketch that has been corrected, after correction is completed depending on the removal of the third point, and to display the searched object model on a screen,
    wherein the removal of the third point is determined by the following Equation:

if $\theta(x,p) < \alpha/\text{dist}(o,p)$ then Remove(x)   [Equation]

wherein o represents a reference point, p represents a second point, x represents a third point, $\alpha$ represents a preset constant, $\theta(x, p)$ represents angle between point x and p, and dist(o,p) represents distance between o and p.

2. The mixed reality based 3D sketching device of claim 1, wherein the marker pen is a cube-type marker pen configured so that a marker is attached to an entire outer surface of a cylinder structure.

3. The mixed reality based 3D sketching device of claim 1, wherein the program commands orthogonally project the 3D sketch that has been corrected into a 2D image, extract a characteristic value, compare the extracted characteristic value with a previously stored 3D object model, and search a 3D object model corresponding to the 3D sketch.

4. A mixed reality based 3D sketching method of performing a mixed reality based 3D sketch in a device including a processor and a memory, the method comprising:
    periodically tracking a marker pen photographed through a camera;
    determining whether to remove a third point using a distance between a first point corresponding to a reference point, among points that are sequentially tracked, and a second point at a current time, a preset constant, and an angle between the first point, the second point, and the previously identified third point,
    searching an object model corresponding to a 3D sketch that has been corrected, after correction is completed depending on the removal of the third point, and
    displaying the searched object model on a screen,
    wherein the removal of the third point is determined by the following Equation:

if $\theta(x,p) < \alpha/\text{dist}(o,p)$ then Remove(x)   [Equation]

wherein o represents a reference point, p represents a second point, x represents a third point, $\alpha$ represents a preset constant, $\theta(x, p)$ represents angle between point x and p, and dist(o,p) represents distance between o and p.

5. A program stored in a non-transitory recording medium for performing the method of claim 4.

* * * * *